April 23, 1935. O. R. WIKANDER 1,998,477
RING SPRING SUSPENSION FOR AUTOMOBILES
Filed Jan. 30, 1930 6 Sheets-Sheet 1

Inventor:
Oscar R. Wikander
John C. Carpenter
Atty:-

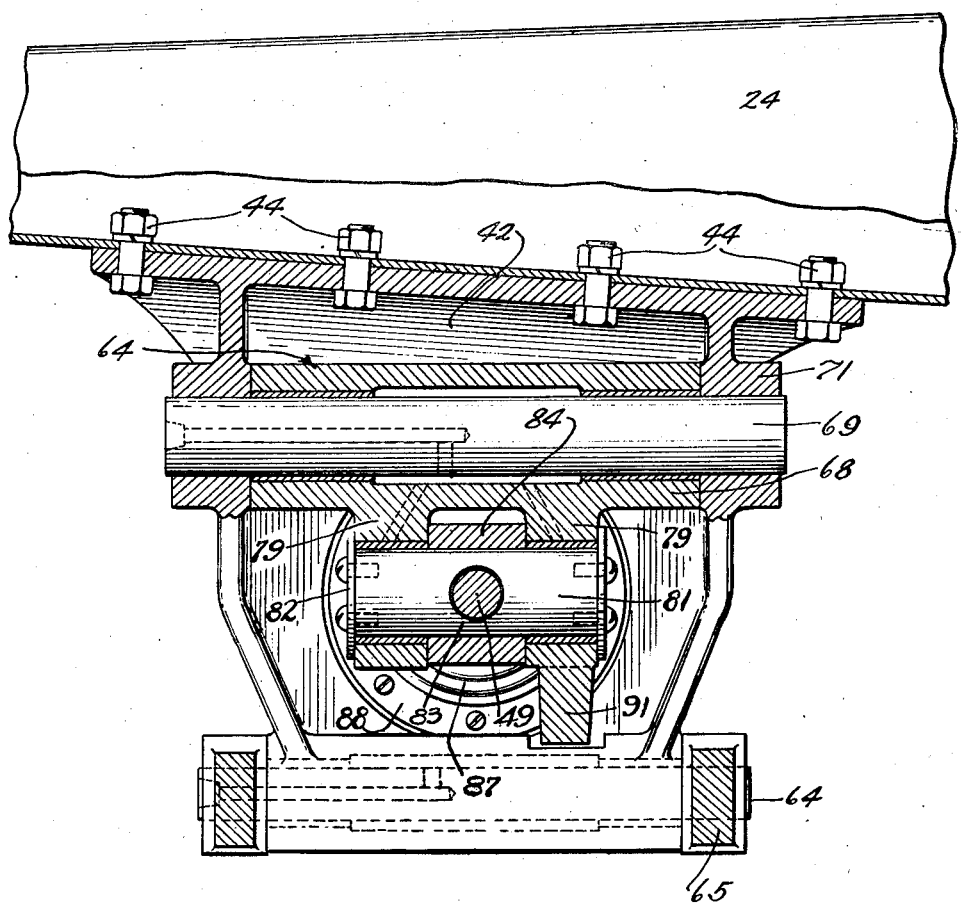

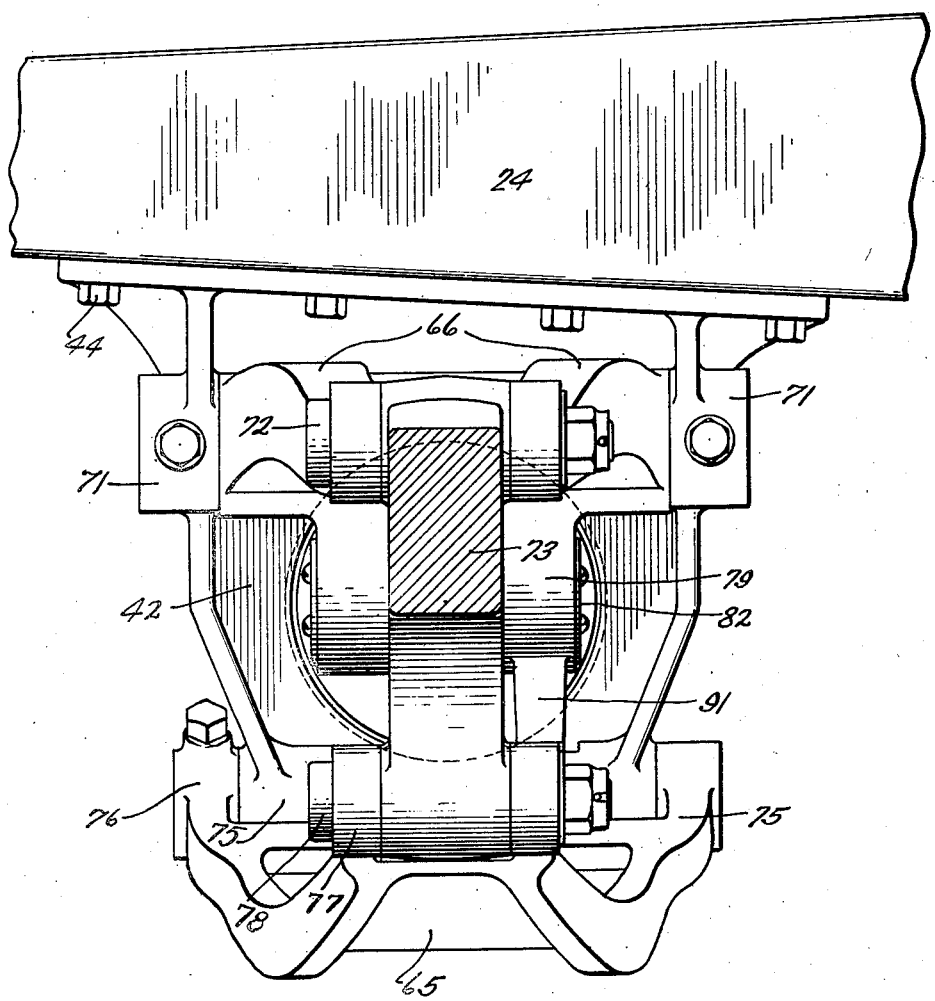

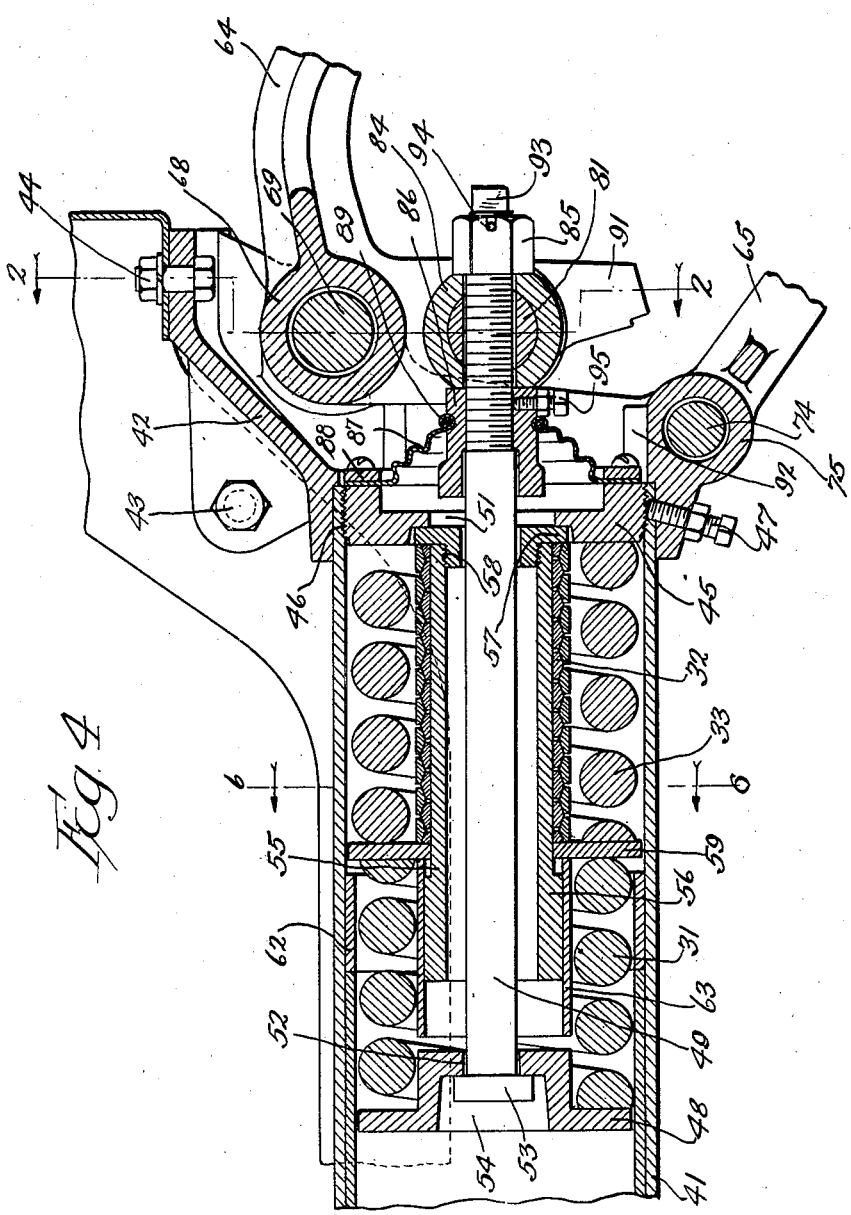

April 23, 1935. O. R. WIKANDER 1,998,477
RING SPRING SUSPENSION FOR AUTOMOBILES
Filed Jan. 30, 1930 6 Sheets-Sheet 5
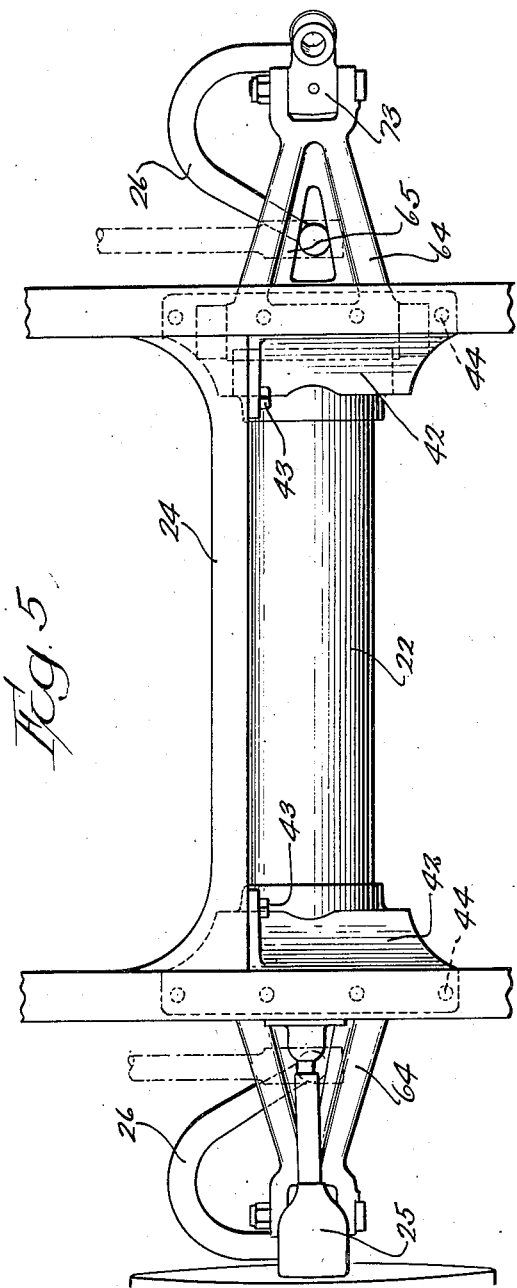
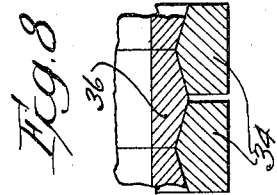
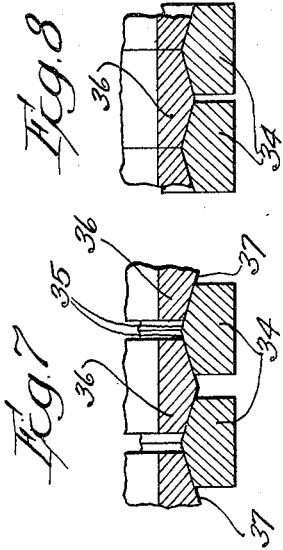
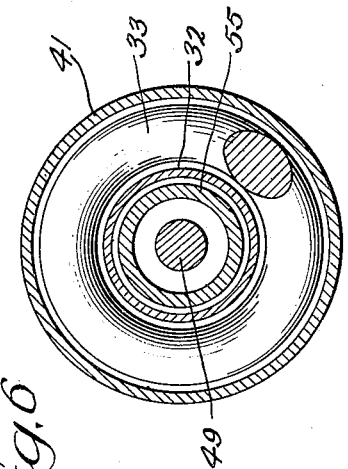
Inventor:-
Oscar R. Wikander
John C. Carpenter
Atty:-

April 23, 1935. O. R. WIKANDER 1,998,477
RING SPRING SUSPENSION FOR AUTOMOBILES
Filed Jan. 30, 1930 6 Sheets-Sheet 6
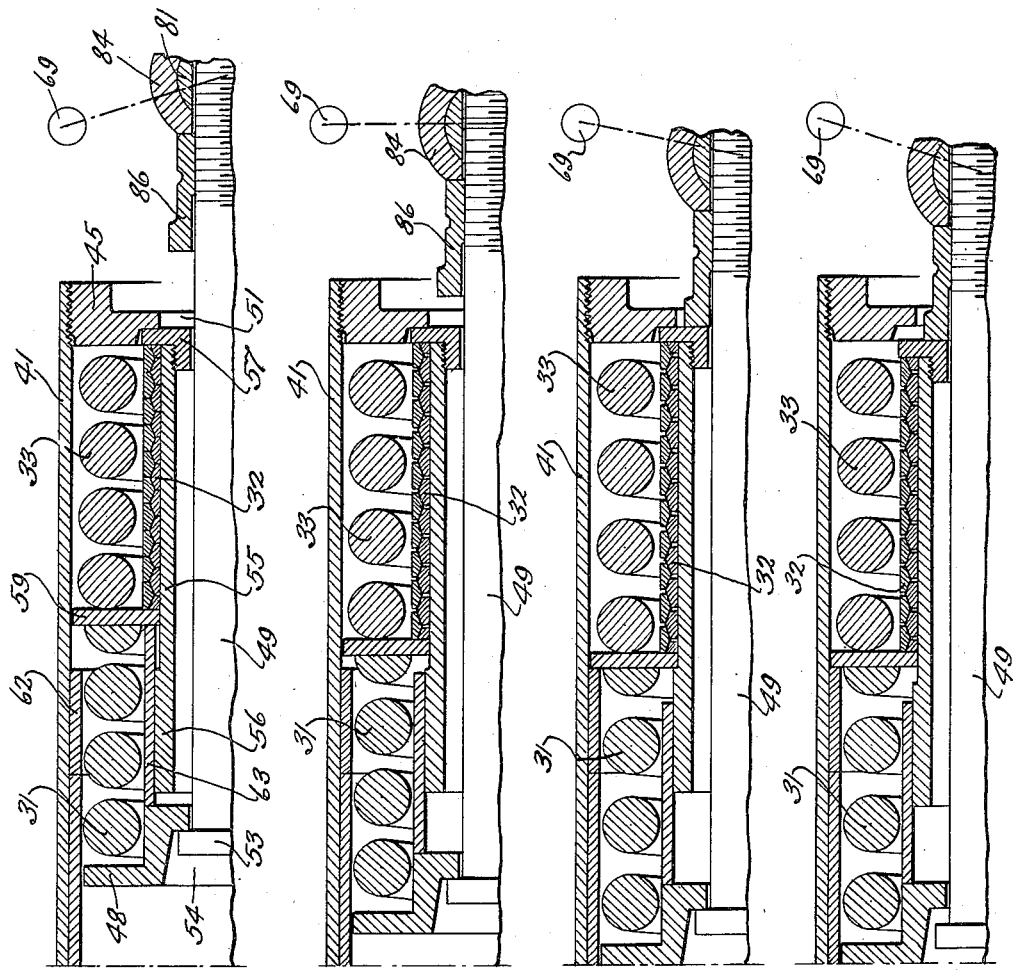
Inventor
Oscar R. Wikander
John C. Carpenter
Atty.

Patented Apr. 23, 1935

1,998,477

UNITED STATES PATENT OFFICE 1,998,477

RING SPRING SUSPENSION FOR AUTOMOBILES

Oscar R. Wikander, Pittsburgh, Pa., assignor to Edgewater Steel Company, Pittsburgh, Pa., a corporation of Pennsylvania Application January 30, 1930, Serial No. 424,501

5 Claims. (Cl. 267—20)

This invention relates in general to suspension or spring assemblies for vehicles, and while it has more particular reference to spring suspension assemblies for automobiles and the like, it will be readily understood that the invention has other and more general application. A principal object of this invention is the provision of an improved suspension or axle assembly for motor-driven vehicles which, while being fully resilient and sensitive to minor vibrations and shocks, will absorb the more severe impacts and jars with minimum recoil and rebound of the vehicle body.

Another important object of the invention is the provision of an improved spring suspension for motor-driven vehicles in which the more severe jars and shocks are absorbed in friction springs which dissipate or spread the energy absorbed from impact in the friction of the cushioning springs with corresponding reduction in recoil or rebound.

Another important object of the invention is the provision of an improved vehicle spring suspension which will interpose frictional resistance to both impact and rebound, i. e. which will cushion sudden movement of the vehicle body in both up and down directions.

Another important object of the invention is the provision of a combined axle and spring suspension assembly which, particularly when employed at the front of a motor-driven vehicle, provides an axle construction of great strength and stiffness. The invention contemplates in this regard the mounting of the shock absorbing cushioning element in a tube which forms a part of the frame of the vehicle.

Another important object of the invention is the provision of a vehicle spring suspension of the character described which may be so constructed and mounted as to insure that the road engaging part of the tire tread will move always in a straight vertical travel and maintain a uniform distance from the road engaging portion of the companion wheel at the other side of the vehicle, thus protecting the tires against scuffing and undue wear.

Numerous other objects and advantages of the invention will be apparent as it is better understood from the following description, which, taken in connection with the accompanying drawings, discloses a preferred embodiment thereof.

In the drawings,

Fig. 2 is a section taken substantially on the line 2—2 of Fig. 4;

Fig. 3 is a section taken substantially on the line 3—3 of Fig. 1, parts being omitted;

Fig. 4 is an enlarged partial sectional view of one of the spring unit assemblies;

Fig. 5 is a top plan view of an axle and spring suspension assembly, parts of the automobile chassis and the wheels being omitted;

Fig. 6 is a section taken substantially on the line 6—6 of Fig. 4;

Figs. 7 and 8 are fragmentary sectional views through the friction spring organization; and Figs. 9, 10, 11 and 12 are partial sectional views showing the relative positions of the parts assumed as an incident to the absorption and cushioning of impact and recoil.

Figure 1:
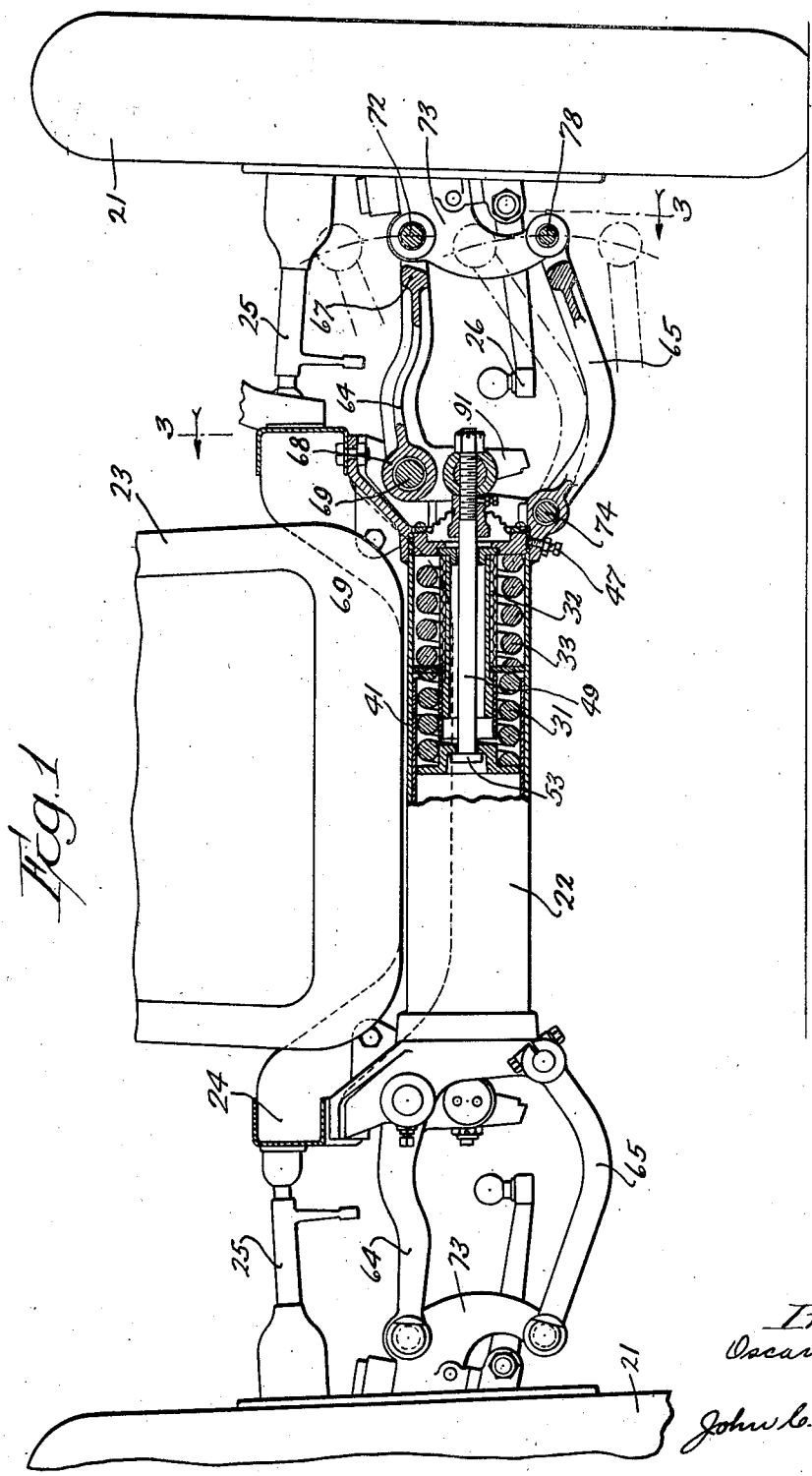
Figure 1 is a partial front elevation of an automobile provided with a spring suspension or axle assembly embodying the instant invention, parts being broken away and shown in section to disclose certain details of construction.

Figure 1 of the drawings shows somewhat schematically the front of an automobile or other motor vehicle. On this figure reference character 21 indicates the wheels, reference character 22 generally the main member of the front axle and spring suspension embodying the invention, reference character 23 the radiator, and reference character 24 the chassis. The connection of the axle and spring suspension assembly 22 to the wheels will be described in detail hereinafter. It may be mentioned, however, that the mechanism indicated by reference character 25 is the brake control, and the mechanism indicated by reference character 26 is the steering device.

In the embodiment of the invention shown on the drawings, the springs and shock absorbing devices are arranged within a tubular member which constitutes the major member of the front axle of the vehicle and also a member of the frame. The wheels support the chassis through and from this tubular member and through and from also the spring and shock absorbing units it contains. One of these units is arranged at each side of the vehicle, i. e. at each end of the tubular member, and each unit acts independently of the other, both of course acting simultaneously and in conjunction when like impact or shock is sustained by the two wheels simultaneously.

Each spring unit consists in the present embodiment of the invention of a non-friction coil spring 31 which sustains and absorbs the minor shocks and vibrations in service, and a friction spring 32 and a non-friction spring 33 which together receive and absorb the more severe shocks and impact. The spring 32 of the unit is arranged in parallel with the spring 33 and these two springs are arranged in series with the spring 31. The housing and controlling members for these springs are preferably so constructed and arranged that all function in initial relative movements between the wheels and chassis and are so constructed that when the relative movement between the chassis and wheels has exceeded a predetermined amount the spring 31 is rendered inactive and the forces of impact are sustained by the parallelly arranged friction spring 32 and the non-friction spring 33.

The housing and controlling members are preferably also arranged so as to cause the friction spring 32 to receive and absorb the shock of recoil and reduce the rebound of the chassis and car body. The non-friction springs are or may be of the ordinary coil type, and the friction spring is preferably of the ring spring construction shown, described and claimed in United State Letters Patent to Ernest Kreissig, No. 1,515,346. Particular description of the non-friction spring and of the ring spring is not believed necessary.

It may be mentioned, however, that the spring consists of an outer and an inner set of ring elements. The ring elements of the outer set indicated by reference character 34 in Figs. 7 and 8 are provided with oppositely extending internal bevelled faces 35, and the ring elements 36 of the inner set are provided with bevelled faces 37 formed to mate with and slidably engage the bevelled faces 35 of adjacent outer ring elements 34. All of the rings of both sets are or may be continuous and the spring action is accomplished by the stretching of the material of the outer ring elements and the compression of the material of the inner. It will be readily observed that a ring spring of this character absorbs a considerable percentage of the force of compression in friction between the engaging surfaces in contracting. Ring springs, constructed and arranged as above set forth, absorb a considerable percentage of the shocks and jars sustained which are dissipated in friction. Accordingly for the purposes of this invention, these springs are referred to as friction springs and the coil springs as non-friction springs.

The tube 41 which forms the outer or main member of the axle and which houses the two spring assemblies is secured at each end to a supporting bracket 42 in turn connected at 43 and 44 with the chassis of the vehicle. A plug or head 45 is threadedly engaged at 46 in each end of the tube and if desired a set screw 47 may be provided to hold the parts in desired assembled relation. The springs 31, 32 and 33 are arranged back of the head or plug 45 and between it a movable disk or plate 48. A rod or bolt 49 is positioned through an aperture 51 in the head 45, through the springs and through an aperture 52 in the plate 48, the head 53 of the rod or bolt 49 being disposed in a recess or countersink 54 in the plate 48.

A sleeve 55 is provided about the rod 49 and within the springs 31, 32 and 33. This sleeve has an integral enlargement 56 at its inner end and an enlargement 57 at its outer end, the last mentioned enlargement being provided by a flanged collar threadedly engaging the sleeve 55 at 58. The friction spring 32 is arranged between the collar 57 and intermediate disk or plate 59 which is loosely mounted upon the sleeve. The spring 31 is arranged between the plate 59 and the plate 48. The spring 33 is concentric to the spring 32 and bears at one end upon the head or plug 45 and at the other against the plate 59. The arrangement of the springs is such, as will be observed, that the collar 57 is normally pressed against the head 45 by the friction spring 32 and this collar extends over the portion of the opening 51 which is not occupied by the rod 49.

A tube 62 is fixed within the axle tube 41 and forms a stop for the inward movement of the plate 59. A floating sleeve 63 is arranged to closely embrace and slide upon an enlargement 56 of the sleeve 55 and this sleeve also under certain conditions to be later explained forms a stop for the plate 59.

Each wheel is connected to its axis and to its spring assembly by a parallel motion device which consists principally of an upper connector or link 64 and a lower connector or link 65. Viewing Fig. 1 of the drawings, it will be noted that the link 65 is made longer than the link 64, the purpose of this being to permit easy control of the spread between the road engaging portions of the tire, the arrangement in the embodiment shown on the drawings reserving substantially a uniform distance between them as the wheels move in service. The upper link or connector swinging about a shorter radius moves the bottom of the tire outwardly to compensate for the inward movement of the wheel body. As the body and wheels move relatively as the result of jars and shocks in service, the links are or may be so proportioned as to cause the wheels to merely tilt about the points engaging the road surface throughout the range of movement permitted by the spring suspension, thereby preventing scuffing or dragging of the tires crosswise of the road bed.

Each of the links 64 and 65 preferably consist of a well reinforced generally rectangular skeleton member. The link 64 consists of two side members 66 and cross reinforcing parts 67 and 68. A bearing rod or pivot 69 is arranged through the cross member 68 and extends into or through bearing lugs 71 of the bracket 42. The outer ends of the members or parts 66 of the link 64 are suitably pivoted at 72 to the king pin carrying member 73 of the wheels. Link 65 is similarly constructed and is pivoted to a shaft 74 carried in a bearing 75 at the lower end of the bracket 42.

In the embodiment of the invention shown on the drawing, the link or connector 65 is provided with lugs 76 extending rearwardly and arranged on opposite sides of the bearing 75. The shaft 74 extending through this bearing and through these lugs provides pivotal connection. The link or connector 65 has outwardly or forwardly extending lugs 77 which are pivoted to the king pin carrying member 73 by a pivot pin 78''.

The link or connector 64 is provided with two downwardly extending arms 79 which are apertured horizontally to receive an oscillating cross shaft 81 held in place by end plates 82. This cross shaft 81 is provided with a transverse aperture 83 and the bolt or rod 49 of the spring assembly extends therethrough. A bushing 84 is arranged about the rod 49 and the shaft 81 to provide flat bearing surfaces for a nut 85 carried on the end of the rod or bolt 49 and for an inner collar 86 fixed upon the rod 49.

A shield 87 of accordion plaited construction and of annular form is clamped at its outer edge at 88 to the head or plug 45 and is secured at 89 to the sleeve or collar 86, the purpose of this shield being to prevent dirt, sand and the like from entering into the spring construction in service.

The action of the parts will perhaps be best understood by reference to Figs. 9 and 12. Each of these figures is a partial section showing a half of the spring suspension assembly at an axle end. The difference between the position of the parts in the several figures is occasioned by different conditions of service and relative movement of the vehicle body with respect to the wheels as an incident to shock or impact. The small circle indicated at 69 in each view represents the pivot 69 of the upper link or connector 64 and the dotted and dash line depending from this circle schematically illustrates the several positions of the downwardly extending arms 70.

Fig. 10 shows the desired relation of the parts when adjusted to properly support the vehicle in normal relation of the chassis and body to the wheel. Viewing this figure, it will be noted that the plate 59, which is arranged between the springs 32 and 33 on the one hand and the spring 31 on the other, is freely floating in this position, minor shocks and vibrations will be taken up by expansion and contraction of the springs 31 and 33, the friction spring 32 being inactive.

When, however, the wheels are forced upwardly upon encountering an obstruction or prominent irregularity in the road, the parts are forced toward the relationship shown in Fig. 9. Movement of the bolt or rod 49 toward the right, viewing Fig. 9, first causes the floating sleeve 63 to be forced by the end plate 48 over into contact with the intermediate plate 59. Continued movement causes compression of the springs 32 and 33 alone, the plate 48 acting through the floating sleeve 63 and intermediate plate 59 to compress the friction spring against the collar 57 and the non-friction spring 33 directly against the plug 45. Fig. 9 represents what may be considered a limit of movement in this direction.

After impact and consequent compression of the springs as just described, they return toward normal position and have, of course, a tendency to recoil and rebound therebeyond. The cushioning and control of such recoil and rebounding action is illustrated in Figs. 11 and 12. From the position shown in Fig. 9, the lever 79 and the spring parts move back to and past that indicated in Fig. 10. After passing the positions there shown, which is occasioned by a release of the earlier compression of the spring by the bolt or rod 49, the springs 32 and 33 force the plate 59 to the left until this plate engages and is stopped by the fixed sleeve 62, thus preventing further compression of spring 31. From the position shown in Fig. 11, the friction spring 32 upon further recoil movement is brought into action to absorb and dissipate the recoil force.

The collar 86 which is fast upon the bolt or rod 49 engages the collar 57 and moves toward the left, being resisted in this movement by the friction spring since the plate 59 is engaged with the presented end of the sleeve 62.

It will thus be observed that the friction spring 32 comes into action to resist excessive relative up and down movement between the wheels and chassis and body in both directions.

One or more lugs 91 may be provided to extend down from the bearing lugs 79 to engage a shoulder 92 and limit the parts in their movement.

Adjustment of the spring suspension unit is accomplished by shifting the cross shaft 81 and the bushing 84 lengthwise of the bolt or rod 49 (reference being had to Fig. 4). The nut 85 may be loosened and the bolt 49 turned by engagement with a square end 93 or other suitable formation. Rotation of the bolt, of course, moves it in or out within the collar 86 and after adjustment the nut 85 may be tightened and a cotter pin 94 may be inserted to lock the nut in place. If desired, a set screw 95 or other suitable locking mechanism may be employed to prevent accidental turning of the collar 86 upon the bolt 49 in service.

It will be apparent from the foregoing that the static load of the sprung body is carried by the frictionless coil spring devices so that the minor oscillations are received by and absorbed in the frictionless coil spring devices and oscillations of more violent character, i. e. oscillations causing the body to move relatively of the frame beyond predetermined limits are received by and absorbed in the frictional ring springs, the frictional resistance increasing in magnitude at a rate greater than increase of oscillation.

It is thought that this invention and many of its attendant advantages will be understood from the foregoing description, and it will be apparent that many changes may be made in the form, construction and arrangement of the parts without departing from the spirit and scope of the invention or sacrificing all of its material advantages, the form hereinbefore described being merely a preferred embodiment thereof.

I claim:

1. A vehicle suspension assembly, comprising a mounting, a friction spring within said mounting, a coil spring within said mounting in series with said friction spring, a vehicle supporting member, and connections between said member and said springs for resisting movement of said member in either direction.

2. A vehicle suspension assembly, comprising a mounting, a friction spring within said mounting, a coil spring within said mounting in series with said friction spring, a vehicle supporting member, connections between said member and said springs for resisting movement of said member in either direction, and means rendering said coil spring inactive after predetermined movement.

3. A vehicle suspension assembly, comprising a tubular member, a friction spring mounted within said tubular member, a non-friction spring mounted in series with said friction spring, an end spring mounted in parallel with said friction spring and in series with the first mentioned non-friction spring, a member maintained in normal vehicle supporting position by said springs, and connections between said member and said springs having parts compressing said springs upon movement of said member in either direction from said normal vehicle supporting position.

4. A vehicle suspension assembly, comprising a chassis, brackets fixedly secured to opposite ends of the chassis, a tubular housing fixedly located between said brackets, a friction spring within said tubular housing, a coil spring serially connected with said friction spring, and another coil spring coaxial with said friction spring, a vehicle supporting member operatively connected with said springs, said springs being adapted to resist movement of said member from normal position in either direction.

5. A vehicle suspension assembly, comprising a chassis, brackets fixedly secured to said chassis at opposite ends thereof, a tubular housing fixedly interposed between said brackets, a friction spring within said tubular housing, a coil spring within said tubular housing and serially connected with said friction spring, a floating disk interposed between said two springs within said tubular housing and permanently engaged with the ends of the spring directed towards each other, another spring coaxially alined with the friction spring, a vehicle supporting member operatively connected with said springs, said springs normally maintaining said supporting member in a neutral position and resisting movement of said supporting member from said neutral position in either direction, and means for rendering the first named coil spring inactive after a predetermined movement.

OSCAR R. WIKANDER.